United States Patent [19]
Zimmermann

[11] Patent Number: 5,442,536
[45] Date of Patent: Aug. 15, 1995

[54] LOW-LOSS POWER SUPPLY DEVICE COMPRISING A DC/DC CONVERTER

[75] Inventor: Andreas Zimmermann, Nürnberg, Germany

[73] Assignee: U.S. Philips Corporation, New York, N.Y.

[21] Appl. No.: 26,710

[22] Filed: Mar. 5, 1993

[30] Foreign Application Priority Data

Apr. 2, 1992 [DE] Germany .................. 42 10 980.9

[51] Int. Cl.[6] .................................................. H02M 3/335
[52] U.S. Cl. ............................................ 363/20; 363/21;
363/101
[58] Field of Search ................... 363/20, 21, 101;
323/282, 259; H02M 3/155

[56] References Cited

U.S. PATENT DOCUMENTS

| | | |
|---|---|---|
| 3,889,177 | 6/1975 | Fendrich . |
| 4,546,304 | 10/1985 | Schwarz ................. 323/287 |
| 4,549,254 | 10/1985 | Kissel ..................... 363/21 |
| 4,767,978 | 8/1988 | Reid ........................ 323/282 |
| 4,829,232 | 5/1989 | Erickson ................ 323/290 |
| 5,101,336 | 3/1992 | Willocx .................. 363/41 |

FOREIGN PATENT DOCUMENTS

| | | | |
|---|---|---|---|
| 0027171 | 4/1981 | European Pat. Off. .... H02M 3/155 |
| 1591630 | 10/1970 | Germany ....................... 363/21 |
| 930301 | 5/1982 | U.S.S.R. ......................... 363/101 |

*Primary Examiner*—Jeffrey L. Sterrett
*Attorney, Agent, or Firm*—Bernard Franzblau

[57] ABSTRACT

A low loss power supply device for generating at least one output voltage ($U_a$) from an input voltage ($U_e$) having an absolute value which is higher than that of the output voltage. The power supply device has a low power loss and minimum space requirements. The power supply device includes a controller for generating the output voltage and a DC/DC converter having a primary circuit and a secondary circuit. The primary circuit voltage is a difference voltage ($U_{c1}$) derived from the output voltage and the input voltage. The secondary circuit generates the output voltage. A further saving of components is achieved by forming the controller from the primary circuit of the DC/DC converter with the primary circuit connected in series with the secondary circuit.

19 Claims, 2 Drawing Sheets

LOW-LOSS POWER SUPPLY DEVICE COMPRISING A DC/DC CONVERTER

BACKGROUND OF THE INVENTION

This invention relates to a power supply device for generating at least one output voltage from an input voltage having an absolute value higher than that of the output voltage and by means of a DC/DC converter which comprises a primary circuit and a secondary circuit.

Power supply devices comprising DC/DC converters supplying one or more output voltages are required for the powering of electronic apparatus. Among clocked DC/DC converters notably the basic types flyback converter and forward converter can be distinguished. Therein, via a controllable switch an input DC voltage is converted into a squarewave voltage which is rectified and smoothed.

European patent 27 171-A1 describes a power supply device comprising a DC/DC converter which is constructed as a forward converter as shown in FIG. 2 of this patent. The DC/DC converter comprises a primary circuit which includes an input capacitor to which an input voltage can be applied. Parallel to the input capacitor there is connected a primary winding of a transformer in series circuit with the switching path of a controllable switch which is constructed as a transistor and which can be controlled by a control circuit at the secondary side of the converter. This series includes an output capacitor. The secondary side includes a secondary winding of the transformer in series with a rectifier diode and the output capacitor across which an output voltage can be derived.

SUMMARY OF THE INVENTION

It is an object of the invention to provide a power supply device of the kind set forth which has a low power loss as well as low space requirements.

In a power supply device of the kind set forth this object is achieved in that there is provided a series controller for generating the output voltage, and in that the primary circuit of the DC/DC converter is arranged to apply a difference voltage formed from the output voltage and the input voltage, and the secondary circuit is adapted to generate the output voltage.

The output voltage is then generated simultaneously by the series controller and the DC/DC converter. The DC/DC converter operates with a supply voltage which is formed from the difference voltage between the output voltage and the input voltage. The DC/DC converter thus operates with a power loss otherwise generated by the series controller. The DC/DC converter is proportioned so that it also supplies the output voltage. A higher efficiency of the power supply device is thus obtained. The DC/DC converter need transfer only a small part of the overall power and can thus be proportioned so as to be smaller and to save space.

Further components are saved when the series controller is formed by the primary circuit of the DC/DC converter, the primary circuit being connected in series with the secondary circuit. In that case, the input voltage is not present on both input terminals of the primary circuit of the DC/DC converter, but only on one input terminal as well as on a common output terminal of the primary and the secondary circuit. The overall efficiency of the power supply device results from the efficiency of the DC/DC converter, formed by the primary and the secondary circuit, and from the ratio of the output voltage to the input voltage. The overall efficiency is then always higher than in a customary DC/DC converter in which the absolute value of the input voltage is higher than that of the output voltage.

When the primary circuit comprises at least one input capacitor and the secondary circuit comprises at least one output capacitor which is connected in series with the input capacitor, the series connection of the input capacitor and the output capacitor being adapted to apply the input voltage and the output capacitor being arranged to derive the output voltage, the input capacitor then will carry the difference voltage consisting of the difference between the output voltage and the input voltage. This offers the advantage that the input capacitor need be proportioned only for this difference voltage so that it can be constructed to be substantially smaller.

A protection against confusion of poles for the input capacitor in the case of overvoltages of the output voltage is achieved in that the primary circuit is connected in series with the secondary circuit via a diode.

Because the voltage applied to the primary circuit is the difference voltage between the output voltage and the input voltage, the DC/DC converter can be proportioned to be smaller so as to save space.

One feasible embodiment of the DC/DC converter in which the secondary circuit operates as a flyback converter is obtained when the primary circuit comprises a primary winding and the secondary circuit comprises a secondary winding, said windings being oppositely poled.

A further embodiment of the DC/DC converter, in which the DC/DC converter operates as a forward converter, is obtained when the primary circuit comprises a primary winding and the secondary circuit comprises a secondary winding, said windings being poled in the same sense.

The DC/DC converter can be readily controlled by means of simple means in that the DC/DC converter comprises a control device for controlling the turn-on times of the controllable switch, there being provided a further secondary winding of a transformer for coupling the primary and secondary winding in order to generate an auxiliary voltage to feed the control device.

When the primary circuit comprises a controllable switch for operation at a high clock frequency, a DC/DC converter of small volume is thus obtained.

BRIEF DESCRIPTION OF THE DRAWINGS

The invention will be described in detail hereinafter on the basis of the embodiments shown in the accompanying drawing.

Therein.

DESCRIPTION OF THE PREFERRED EMBODIMENTS

Figure 1:
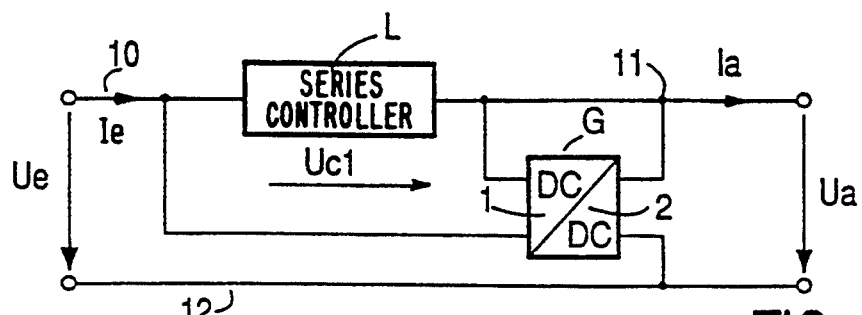
FIG. 1 shows a circuit diagram of a power supply device.

The power supply device shown in FIG. 1 serves to generate an output voltage Ua from an input voltage Ue of an absolute value higher than that of the output voltage Ua. The input voltage Ue is present between input terminals 10 and 12 and the output voltage Ua can be derived between output terminals 11 and 12. The power supply device comprises a series controller L across which a difference voltage $U_{c1}$ is developed. The difference voltage $U_{c1}$ is formed from the difference between the output voltage Ua and the input voltage Ue and serves as an input voltage for a DC/DC converter G which comprises a primary circuit 1 and a secondary circuit 2.

In the power supply device shown in FIG. 1, the output voltage Ua is generated simultaneously by the controller L and the DC/DC converter G. The difference voltage $U_{c1}$ is used as the supply voltage, i.e. as the input voltage for the DC/DC converter G, so that the DC/DC converter G operates with a power loss otherwise generated by the controller L. The DC/DC converter G is proportioned so that it also supplies the output voltage Ua. The transformation ratio of the primary circuit 1 and the secondary circuit 2 is chosen so that the secondary circuit 2 also generates the output voltage Ua. The DC/DC converter G can be proportioned so as to be smaller, and hence space is saved, because it need transfer only a small part of an overall power Pa, i.e. approximately (Ue−Ua)/Ua*Pa. The overall efficiency of the power supply device shown in FIG. 1 results from the efficiency of the DC/DC converter G and the voltage ratio Ua/Ue. The overall efficiency is always higher than in the case where use is made of a power supply device comprising merely a DC/DC converter.

Figure 2:
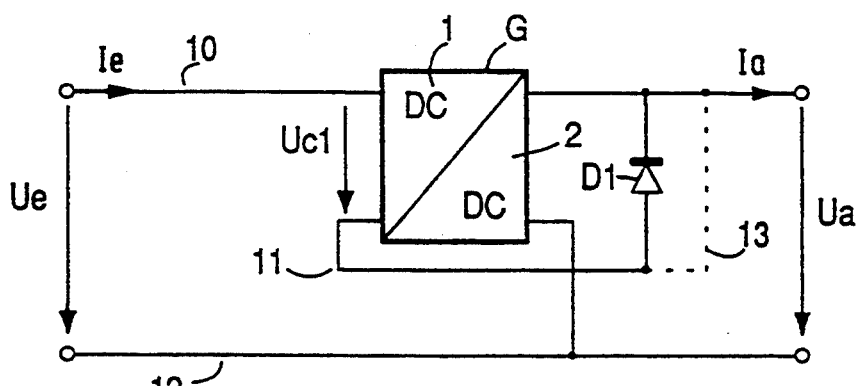
FIG. 2 shows a further circuit diagram of a power supply device.

FIG. 2 shows a further embodiment of a power supply device for generating an output voltage Ua, present between output terminals 11 and 12, from an input voltage Ue a higher absolute value and which is present between input terminals 10 and 12. To this end, use is made of a DC/DC converter G which comprises a primary circuit 1 and a secondary circuit 2. The DC/DC converter G is fed by a difference voltage $U_{c1}$ which is present between the terminals 10 and 11 and which consists of the difference between the output voltage Ua and the input voltage Ue. Via a diode D1, the primary circuit 1 is connected in series with the secondary circuit 2. A dashed line 13 indicates that a direct connection may be provided instead of the diode D1.

The power supply device shown in FIG. 2 can be used, for example, when an only slightly lower output voltage Ua is to be generated from an input voltage Ue and the power loss occurring and the space required are to be minimized. As a result of the series connection of the primary circuit 1 and the secondary circuit 2, the DC/DC converter G need transfer only a small part of the overall power. As a result, the DC/DC converter G can be proportioned so as to be smaller so that space is saved. The input voltage Ue is not present on both input terminals 10 and 11 of the primary circuit 1 of the DC/DC converter G, but only on the input terminal 10 as well as on the common input/output terminal 12 of the primary and the secondary circuit. The overall efficiency $\eta_{ges}$ of the complete power supply device results from the efficiency $\eta_w$ of the DC/DC converter G and from the ratio of the output voltage Ua to the input voltage Ue as follows:

$$\eta_{ges} = Ua*Ia/(Ue*Ie) = Ua/Ue(1-\eta_w) + \eta_w.$$

Therein, the relation $$Ia = Ie + Ie*\eta_w(Ue-Ua)/Ua$$

is used for Ie. The voltage drop across the diode D1 is not taken into account therein. Assuming that $\eta_w < 1$, the overall efficiency is always better than when use is made of a conventional DC/DC converter if the absolute value of the output voltage Ua is smaller than that of the input voltage Ue. Laboratory tests have demonstrated that for a switching frequency of approximately 100 kHz, an overall efficiency $\eta_{ges}$ of approximately 95% can be achieved. The power supply device shown in FIG. 2 is independent of the type of DC/DC converter G that is used. A condition to be satisfied consists in that electric isolation between the primary and the secondary side can be dispensed with. When a diode D1 is used, the difference voltage $U_{c1}$ must be greater than the voltage drop across the diode D1.

Figure 3:
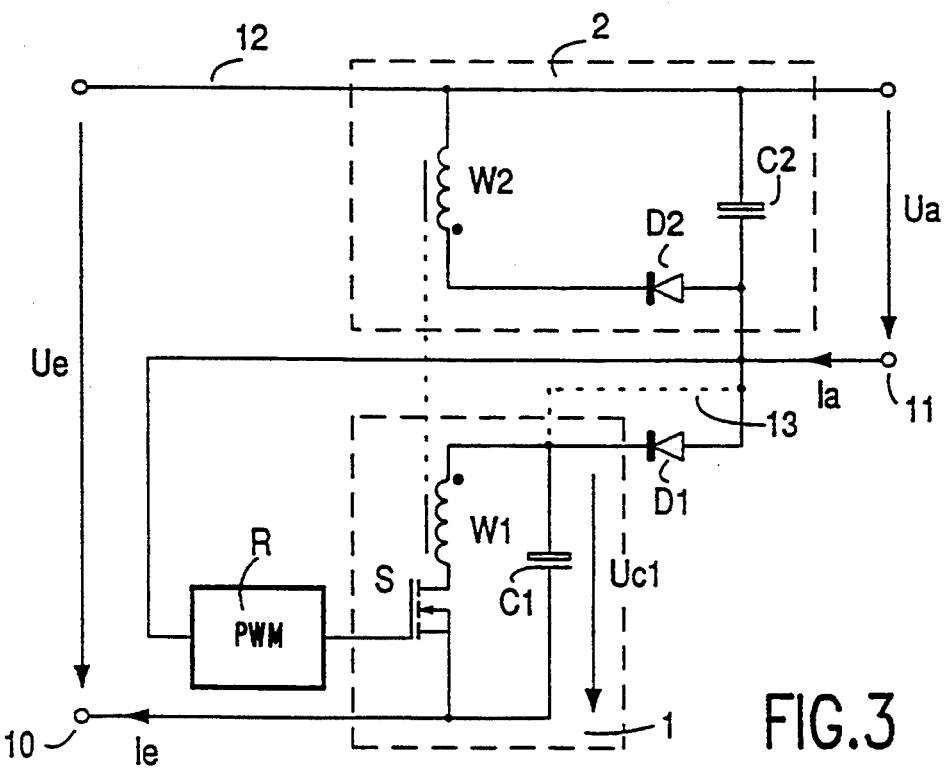
FIG. 3 shows an exemplary circuit for a power supply device.

FIG. 3 shows a further embodiment of a power supply device for generating an output voltage Ua from an input voltage Ue of higher absolute value. The power supply device comprises a DC/DC converter 1, 2 having a primary circuit 1 and a secondary circuit 2. The primary circuit comprises a controllable switch S which is connected in series with a primary winding W1, an input capacitor C1 being connected parallel to the series connection of the switching path of the controllable switch S and the primary winding W1. The secondary circuit 2 comprises a secondary winding W2 in series with a rectifier diode D2, an output capacitor C2 being connected parallel to the series connection of the rectifier diode D2 and the secondary winding W2. The controllable switch S is controlled by a control device R, for example, a pulse width modulator which can be controlled via a control voltage derived from the output voltage Ua. The secondary circuit 1 is connected in series with the primary circuit 2 via a connection 13 or via a diode D1.

Due to the series connection of the primary circuit 1 and the secondary circuit 2, only a difference voltage $U_{c1}$, which is composed of the difference between the output voltage Ua and the input voltage Ue, is present across the input capacitor C1 of the DC/DC converter 1, 2. This offers the advantage that the input capacitor C1 need be proportioned only for this difference voltage $U_{c1}$ and hence can be constructed to be substantially smaller. In the embodiment shown in FIG. 3, the primary winding W1 and the secondary winding W2 are oppositely wound in respect of the difference voltage $U_{c1}$ and the output voltage Ua. During the conductive and the blocked phase of the controllable switch S a substantially constant current flows from the input to the output of the circuit, because the input capacitor C1 already forms a mean value for the conductive and the blocked phase. In addition, during the blocked phase a gradually decreasing current flows through the secondary winding W2 to the output. The input capacitor C1 thus also contributes to the smoothing of the output voltage Ua so that, for the same ripple of the output voltage Ua, the output capacitor C2 can be proportioned so as to be substantially smaller.

Figure 4:
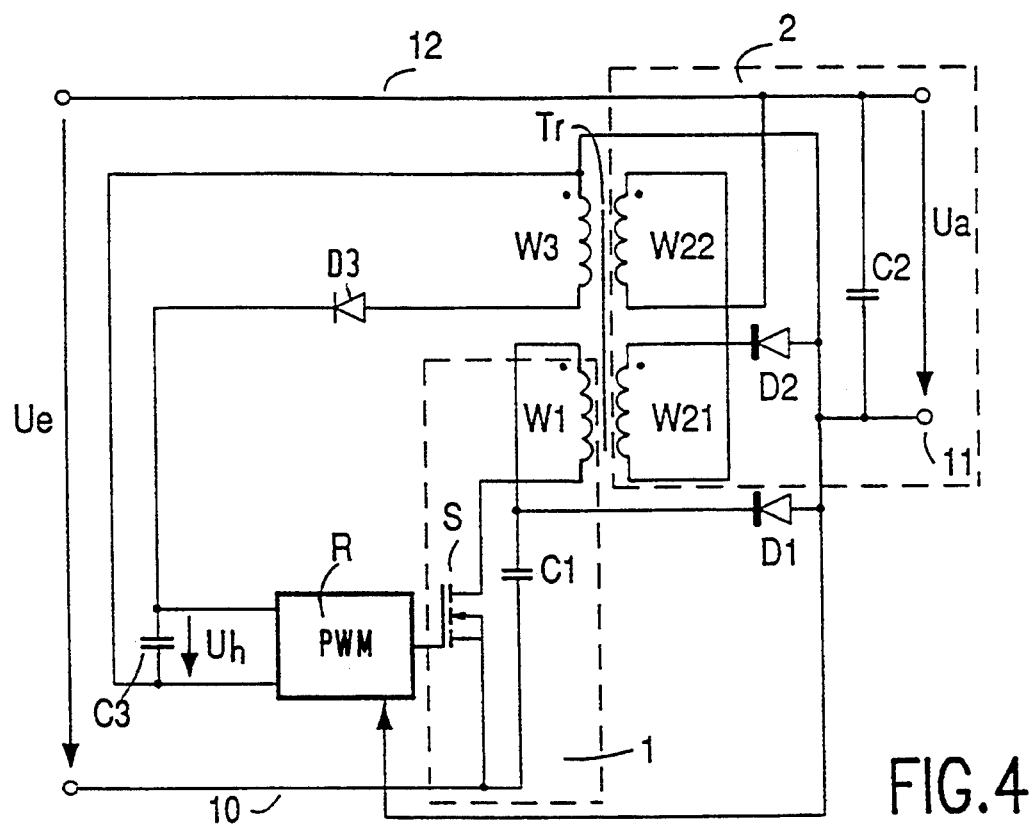
FIG. 4 shows a further embodiment for a power supply device.

FIG. 4 shows a further embodiment of a power supply device comprising a primary circuit 1 and a secondary circuit 2. In this Figure the references symbols already introduced with reference to FIGS. 1 to 3 are used again. The construction of the primary circuit 1 corresponds to the embodiment shown in FIG. 3. The secondary circuit 2 essentially corresponds also to the DC/DC converter shown in FIG. 3. Only the secondary winding of the transformer Tr in the secondary circuit 2 is formed by series-connected windings W21, W22. The transformer Tr also comprises a further secondary winding W3 to which a diode D3 is connected in series with a capacitor C3. An auxiliary voltage Uh for powering the control device R can be derived from the capacitor C3. To this end, the capacitor C3 is connected to the input terminal 10 of the primary circuit 1.

The function of the power supply device shown in FIG. 4 corresponds essentially to the operation described with reference to FIG. 3. The subdivision of the secondary winding into two series-connected secondary windings W21 and W22 offers the advantage that improved coupling can thus be achieved between the primary and the secondary winding.

Figure 5A:
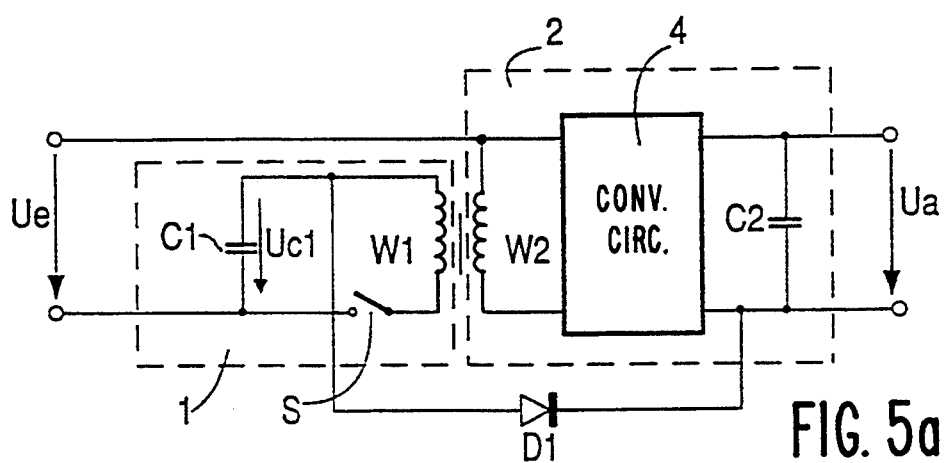
FIGS. 5a, b, c show a power supply device comprising feasible embodiments of the DC/DC converter.
Figure 5B:
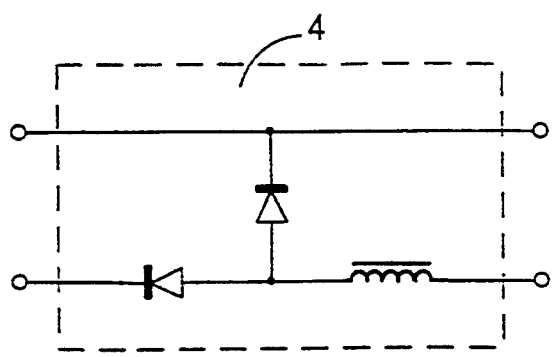
Figure 5C:
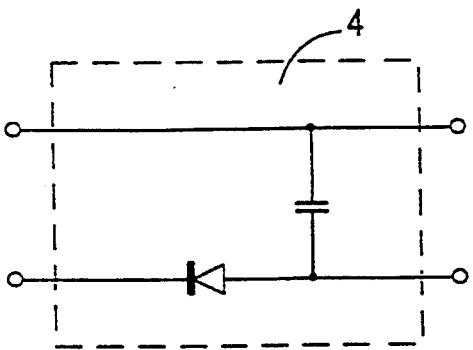

FIG. 5a shows a further embodiment of a power supply device. Therein, the references introduced with reference to FIGS. 1 to 4 are used again. Contrary to the power supply devices shown in FIGS. 3 and 4, in the embodiment shown in FIG. 5a the secondary circuit 2, which is connected to the secondary winding W2 of the transformer Tr, comprises merely a block 4 to which the output capacitor C2 is connected. FIGS. 5b and 5c show a circuit-technical implementation for this block 4. It appears that the secondary circuit 2 shown in FIG. 5a can be constructed as a flyback converter (FIG. 5c) as well as a forward converter (FIG. 5b). When the secondary circuit is constructed as a flyback converter, the primary winding W1 and the secondary winding W2 are oppositely poled. When the secondary circuit 2 is constructed as a forward converter, the primary winding and the secondary winding, however, are poled in the same sense.

The embodiments shown in FIGS. 3 to 5 represent respective power supply devices for a negative input and output voltage. In principle, the power supply devices shown are also suitable for positive input and output voltages. Such an implementation is obtained for the embodiment shown in FIG. 3 by mirroring the circuit elements relative to the connection lead from the output terminal to the control device R and by replacing the switching transistor by an appropriately adapted transistor.

I claim:

1. A power supply device for generating at least one output voltage (Ua) from an input voltage (Ue) having an absolute value higher than that of the output voltage comprising: a DC/DC converter which comprises a primary circuit and a secondary circuit and with the primary circuit connected in series with the secondary circuit, wherein the primary circuit of the DC/DC converter is adapted to apply a difference voltage ($U_{c1}$) formed from the output voltage and the input voltage and the secondary circuit is arranged to generate the output voltage, and the primary circuit comprises at least one input capacitor and the secondary circuit comprises at least one output capacitor which is connected in series with the input capacitor, the input voltage being applied to the series connection of the input capacitor and the output capacitor and the output capacitor being arranged to derive the output voltage.

2. A power supply device as claimed in claim 1 wherein the primary circuit and the secondary circuit comprise a primary winding and a secondary winding, respectively, of a transformer, a controllable switch coupled to the primary winding, and wherein the DC/DC converter comprises a control device for controlling the turn-on times of the controllable switch, and a further secondary winding of the transformer coupling the primary and secondary windings in order to generate an auxiliary voltage for energizing the control device.

3. A power supply device as claimed in claim 1 wherein the primary circuit is connected in series with the secondary circuit via a diode.

4. A power supply device for generating at least one output voltage (Ua) from an input voltage (Ue) having an absolute value higher than that of the output voltage comprising: a DC/DC converter which comprises a primary circuit and a secondary circuit and with the primary circuit connected in series with the secondary circuit, wherein the primary circuit of the DC/DC converter is adapted to apply a difference voltage ($U_{c1}$) formed from the output voltage and the input voltage and the secondary circuit is arranged to generate the output voltage, and the primary circuit is connected in series with the secondary circuit via a diode.

5. A power supply device as claimed in claim 4 wherein the primary circuit comprises a primary winding of a transformer and the secondary circuit comprises a secondary winding of the transformer, said windings being poled in the same sense.

6. A power supply device as claimed in claim 4 wherein the primary circuit comprises a primary winding of a transformer and the secondary circuit comprises a secondary winding of the transformer, said windings being oppositely poled.

7. A power supply device as claimed in claim 4 wherein the primary circuit and the secondary circuit comprise a primary winding and a secondary winding, respectively, of a transformer, a controllable switch coupled to the primary winding, and wherein the DC/DC converter comprises a control device for controlling the turn-on times of the controllable switch, and a further secondary winding of the transformer coupling the primary and secondary windings in order to generate an auxiliary voltage for energizing the control device.

8. A power supply device as claimed in claim 4 wherein the primary circuit and the secondary circuit comprise a primary winding and a secondary winding, respectively, of a transformer, a controllable switch coupled to the primary winding, and wherein the DC/DC converter comprises a control device for controlling the turn-on times of the controllable switch, and a further secondary winding of transformer coupling the primary and secondary windings in order to generate an auxiliary voltage for energizing the control device.

9. A power supply device as claimed in claim 4 wherein the primary circuit comprises a primary winding and the secondary circuit comprises a secondary winding, said windings being poled in the same sense.

10. A power supply device as claimed in claim 4 wherein the primary circuit comprises a primary winding and the secondary circuit comprises a secondary winding, said windings being oppositely poled.

11. A power supply device comprising:
a pair of input terminals for connection to a source of input voltage ($U_e$),
a pair of output terminals for deriving an output voltage ($U_a$), where said input voltage is greater than said output voltage, and
a DC/DC converter coupled to said input terminals and to said output terminals such that a primary circuit of the DC/DC converter receives a difference voltage which is the difference of said input voltage and said output voltage, wherein said DC/DC converter further comprises a secondary circuit connected in series with the primary circuit such that the secondary circuit supplies said output voltage ($U_a$) to said output terminals, and
the primary circuit includes a switching transistor connected in a first series circuit with a primary winding of a transformer and an input capacitor connected in parallel with said first series circuit,
the secondary circuit includes a secondary winding of the transformer and an output capacitor connected in parallel,
a control device controlled by the output voltage and having an output coupled to a control electrode of the switching transistor so as to control the switching thereof, and wherein
the primary circuit is connected in series with the secondary circuit via a diode.

12. The power supply device as claimed in claim 11 wherein the secondary circuit further comprises a second diode connected in series circuit with the secondary winding and the first diode and with said first and second diodes connected in series opposition.

13. A power supply device comprising:
a pair of input terminals for connection to a source of input voltage ($U_e$),
a pair of output terminals for deriving an output voltage ($U_a$), where said input voltage is greater than said output voltage, and
a DC/DC converter coupled to said input terminals and to said output terminals such that a primary circuit of the DC/DC converter receives a difference voltage which is the difference of said input voltage and said output voltage, wherein said DC/DC converter further comprises a secondary circuit connected in series with the primary circuit such that the secondary circuit supplies said output voltage ($U_a$) to said output terminals, and the primary circuit includes an input capacitor and the secondary circuit includes an output capacitor connected in series circuits with the input capacitor such that the input voltage is applied across said series circuit and said difference voltage is derived across the input capacitor, said output capacitor being coupled to said output terminals to supply said output voltage to the output terminals.

14. The power supply device as claimed in claim 13 wherein the primary circuit is connected in series with the secondary circuit via a diode.

15. A power supply device comprising:
a pair of input terminals for connection to a source of input voltage ($U_e$),
a pair of output terminals for deriving an output voltage ($U_a$), where said input voltage is greater than said output voltage, and
a DC/DC converter coupled to said input terminals and to said output terminals such that a primary circuit of the DC/DC converter receives a difference voltage which is the difference of said input voltage and said output voltage, wherein said DC/DC converter further comprises a secondary circuit connected in series with the primary circuit such that the secondary circuit supplies said output voltage ($U_a$) to said output terminals, and the primary circuit includes an input capacitor and the secondary circuit includes an output capacitor connected in series circuit with the input capacitor such that the input voltage is applied across said series circuit, said output capacitor being coupled to said output terminals to supply said output voltage to the output terminals.

16. A power supply device as claimed in claim 15 wherein the primary circuit further comprises a controlled transistor switching device and a primary winding of a transformer which are coupled to said input capacitor, and
said secondary circuit includes a secondary winding of said transformer and a diode coupled to said output capacitor.

17. The power supply device as claimed in claim 16 further comprising a second diode connected in series with the primary circuit and the secondary circuit.

18. The power supply device as claimed in claim 16 further comprising a control device controlled by the output voltage and having an output coupled to a control electrode of the transistor switching device so as to control the switching thereof.

19. A power supply device for generating at least one output voltage ($U_a$) from an input voltage ($U_e$) having an absolute value higher than that of the output voltage comprising: a DC/DC converter which comprises a primary circuit and a secondary circuit and with the primary circuit connected in series with the secondary circuit, wherein the primary circuit of the DC/DC converter is adapted to apply a difference voltage ($U_{c1}$) formed from the output voltage and the input voltage and the secondary circuit is arranged to generate the output voltage, and wherein the primary circuit and the secondary circuit comprise a primary winding and a secondary winding, respectively, of a transformer, a controllable switch coupled to the primary winding, and wherein the DC/DC converter comprises a control device for controlling the turn-on times of the controllable switch, and a further secondary winding of the transformer coupling the primary and secondary windings in order to generate an auxiliary voltage to supply the control device.

* * * * *